(12) United States Patent
Johnson

(10) Patent No.: US 7,481,405 B2
(45) Date of Patent: Jan. 27, 2009

(54) METHODS AND APPARATUS FOR SUPPORTING AN APPLIANCE

(75) Inventor: Ronald Miles Johnson, Louisville, KY (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 11/315,973

(22) Filed: Dec. 22, 2005

(65) Prior Publication Data

US 2007/0145229 A1    Jun. 28, 2007

(51) Int. Cl.
*F16M 11/24*    (2006.01)

(52) U.S. Cl. .................... 248/188.3; 248/188.2; 16/32; 16/42 R

(58) Field of Classification Search ............. 248/188.3, 248/23, 188.2, 446; 16/19, 32, 42 R
See application file for complete search history.

(56) References Cited

U.S. PATENT DOCUMENTS

| | | | | |
|---|---|---|---|---|
| 520,432 A | * | 5/1894 | Humphreys | ............... 248/188.3 |
| 2,062,320 A | * | 12/1936 | Langer | ........................ 16/44 |
| 3,304,032 A | * | 2/1967 | Yates | ....................... 248/649 |
| 3,844,578 A | * | 10/1974 | Matyskella et al. | ...... 280/43.22 |
| 4,124,187 A | * | 11/1978 | Webb | ...................... 248/188.3 |
| 4,192,564 A | * | 3/1980 | Losert | .................... 312/351.11 |
| 4,518,142 A | * | 5/1985 | Sulcek et al. | ............... 248/649 |
| 4,693,526 A | | 9/1987 | Spiegel | |
| 4,748,715 A | | 6/1988 | Rice | |
| 4,758,057 A | | 7/1988 | Spiegel | |
| 4,763,868 A | * | 8/1988 | Teich | ......................... 248/558 |
| 4,783,879 A | * | 11/1988 | Weaver | ........................ 16/34 |
| 4,789,121 A | | 12/1988 | Gidseg et al. | |
| 4,801,114 A | * | 1/1989 | Price | ....................... 248/188.3 |
| 5,040,765 A | | 8/1991 | Schonfelder | |
| 6,729,590 B2 | | 5/2004 | Gabriel | |
| 6,871,379 B2 | * | 3/2005 | Ebeling et al. | ................ 16/19 |
| 2003/0126887 A1 | | 7/2003 | Gabriel | |
| 2004/0206196 A1 | | 10/2004 | Gabriel | |
| 2006/0124810 A1 | | 6/2006 | Cotto | |

* cited by examiner

*Primary Examiner*—Amy J. Sterling
(74) *Attorney, Agent, or Firm*—George L. Rideout, Esq.; Armstrong Teasdale LLP

(57) ABSTRACT

An assembly for supporting a home appliance includes a support base and two roller assemblies mounted on the support base. Each roller assembly includes a roller rotatable about a first axis and a rod coupled with the roller assemblies. Each roller assembly is rotatable with respect to the rod about a second axis different than the first axis. The appliance includes a cabinet having a top panel, a bottom panel, side panels, a front panel, and a back panel.

7 Claims, 3 Drawing Sheets

… (US 7,481,405 B2)

METHODS AND APPARATUS FOR SUPPORTING AN APPLIANCE

BACKGROUND OF THE INVENTION

This invention relates generally to assemblies for supporting home appliances, and, more particularly, to methods and apparatus for adjustably supporting appliances.

Home appliances, such as for example, washing machines and dry cleaning machines, are sometimes placed on uneven or sloping surfaces. At least some known home appliances have manually adjustable supports mounted on the underside of a cabinet. These supports are individually adjustable so they can be employed for compensating for slope in a supporting surface from front to back and also from side to side. The front supports, usually two in number, often are adjusted to unequal lengths to compensate for the side-to-side slope in the supporting surface. The rear supports, usually two in number, are also adjusted correspondingly to ensure the cabinet is uniformly supported on all four supports. Otherwise, the cabinet may tend to rock or tilt if it is supported by only on three of its four supports.

However, such appliances are generally heavy and often placed in confined areas. It is typically difficult to provide access to the rear supports for adjusting such supports to compensate for a sloping surface, especially when the slope is from side to side.

BRIEF DESCRIPTION OF THE INVENTION

In one aspect, an assembly for supporting a home appliance is provided. The appliance includes a cabinet having a top panel, a bottom panel, side panels, a front panel, and a back panel. The assembly includes a support base, two roller assemblies mounted on the support base, each roller assembly including a roller rotatable about a first axis, and a rod coupled with the roller assemblies. Each roller assembly is rotatable with respect to the rod about a second axis different than the first axis.

In another aspect, a home appliance is provided. The appliance includes a cabinet having a top panel, a bottom panel, side panels, a front panel, and a back panel. A wash tub is positioned within the cabinet, a basket is rotatably mounted within the wash tub, and an adjusting assembly supports the cabinet thereon. The adjusting assembly includes a support base, two roller assemblies mounted on the support base, and a rod coupled with the roller assemblies. Each roller assembly includes a roller rotatable about a first axis. The rod is configured to move substantially on a first plane to lift one of the roller assemblies when lowering another one of the roller assemblies.

In still another aspect, a method for providing a home appliance is provided. The method includes providing a cabinet having a top panel, a bottom panel, side panels, a front panel, and a back panel. The method also includes positioning a wash tub within the cabinet, rotatably mounting a basket within the wash tub, and providing an assembly to support the cabinet thereon. The step of providing an assembly includes providing a support base, mounting two roller assemblies on the support base, each roller assembly having a roller rotatable about a first axis, and coupling a rod with the roller assemblies. Each roller assembly is rotatable with respect to the rod about a second axis different than the first axis. The rod is configured to move substantially on a first plane to lift one of the roller assemblies when lowering another one of the roller assemblies.

DETAILED DESCRIPTION OF THE INVENTION

Figure 1:
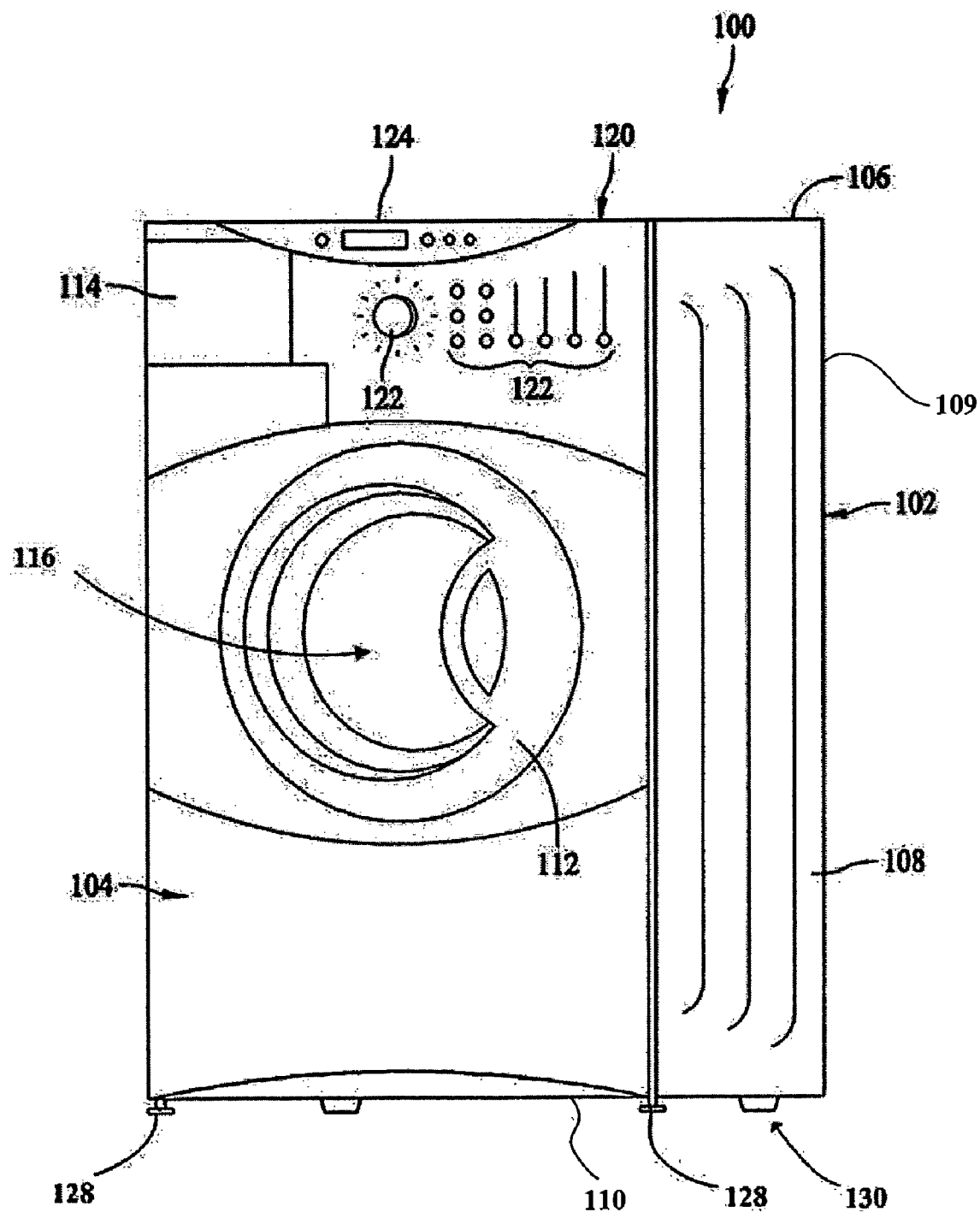
FIG. 1 is a perspective view of an exemplary washing machine.

FIG. 1 is a perspective view of an exemplary washing machine 100 applicable to the present invention. Washing machine 100 includes a cabinet 102 having a front panel 104, a top panel 106, side panels 108, a rear panel 109, and a bottom panel 110. A door 112 is mounted to front panel 104 and is rotatable about a hinge (not shown) between an open position (not shown), which facilitates access to a wash tub 116 positioned in the interior of washing machine 100 and a basket (not shown) rotatably mounted within wash tub 116 that holds a clothes load, and a closed position (as shown in FIG. 1) forming a substantially sealed enclosure over the basket. Front panel 104 also includes a dispenser 114 for adding washing detergent into wash tub 116. A control panel 120 including a plurality of input selectors 122 is coupled to an upper portion of front panel 104. Control panel 120 and input selectors 122 collectively form a user interface utilized by an operator to select machine cycles and features. In one embodiment, a display section 124 indicates selected features, machine status, and other items of interest to the user.

In the exemplary embodiment, washing machine 100 includes two independently adjustable threaded supports, or rollers, 128 mounted on bottom panel 110 and adjacent front panel 104. Machine 100 also includes a self-adjustable supporting assembly 130 mounted on bottom panel 110 adjacent rear panel 109. Rollers 128 and supporting assembly 130 may be adjusted to maintain cabinet 102 level. Specifically, rollers 128 may be manually rotated to vary their length and compensate for a slope or uneveness of a floor or supporting surface (not shown) where washing machine 100 is placed. Supporting assembly 130 may be automatically adjusted to compensate for the slope of the floor. In an alternative embodiment, rollers 128 are replaced by other structures known in the art for manually adjusting the length.

As illustrated in FIG. 1, washing machine 100 is a horizontal axis washing machine 100. It is contemplated that the benefits of the invention accrue to vertical axis clothes treating apparatus, such as for example, vertical axis washing machines. It is also contemplated that the benefits of the invention accrue to other types of home appliances, such as for example, dry cleaning machines and refrigerators.

Figure 2:
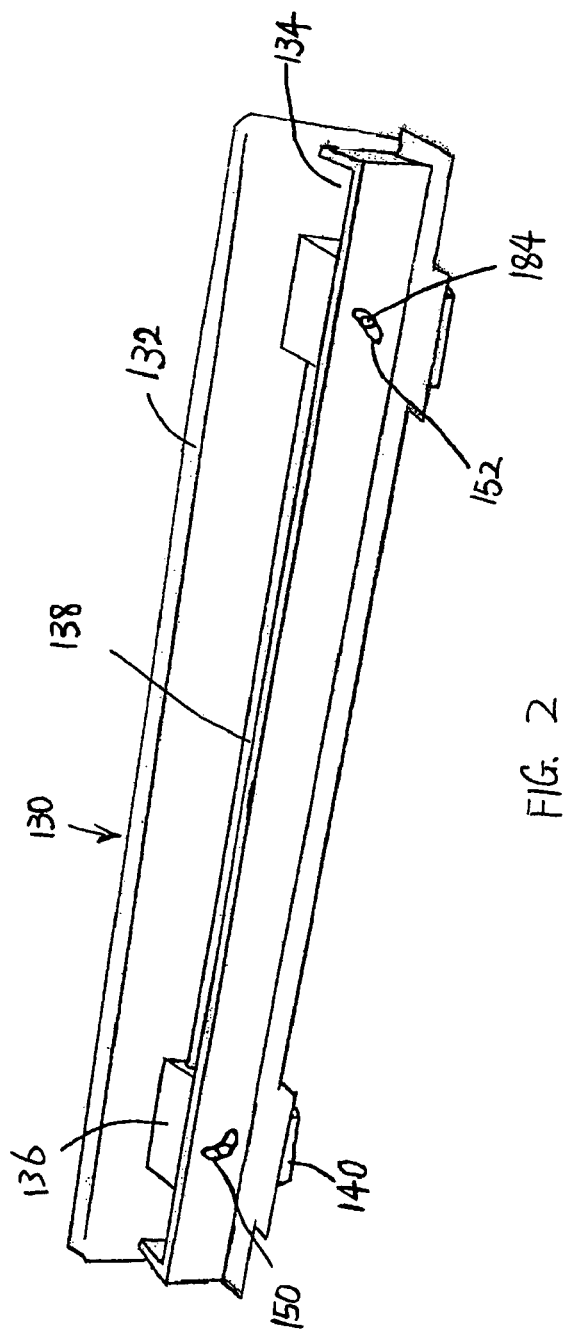
FIG. 2 is a perspective view of an exemplary self-adjustable supporting assembly applicable to the washing machine shown in FIG. 1.

FIG. 2 is a perspective view of an exemplary self-adjustable supporting assembly 130 applicable to washing machine 100 shown in FIG. 1. Supporting assembly 130 includes a support base 132 having a support channel 134 defined therein, two roller assemblies 136 partially received in support channel 134, and a rod 138 connecting roller assemblies 136. Each roller assembly 136 includes a cylindrical roller 140 rotatably received therein. In alternative embodiments, roller 140 has a slope other than cylindrical.

Figure 3:
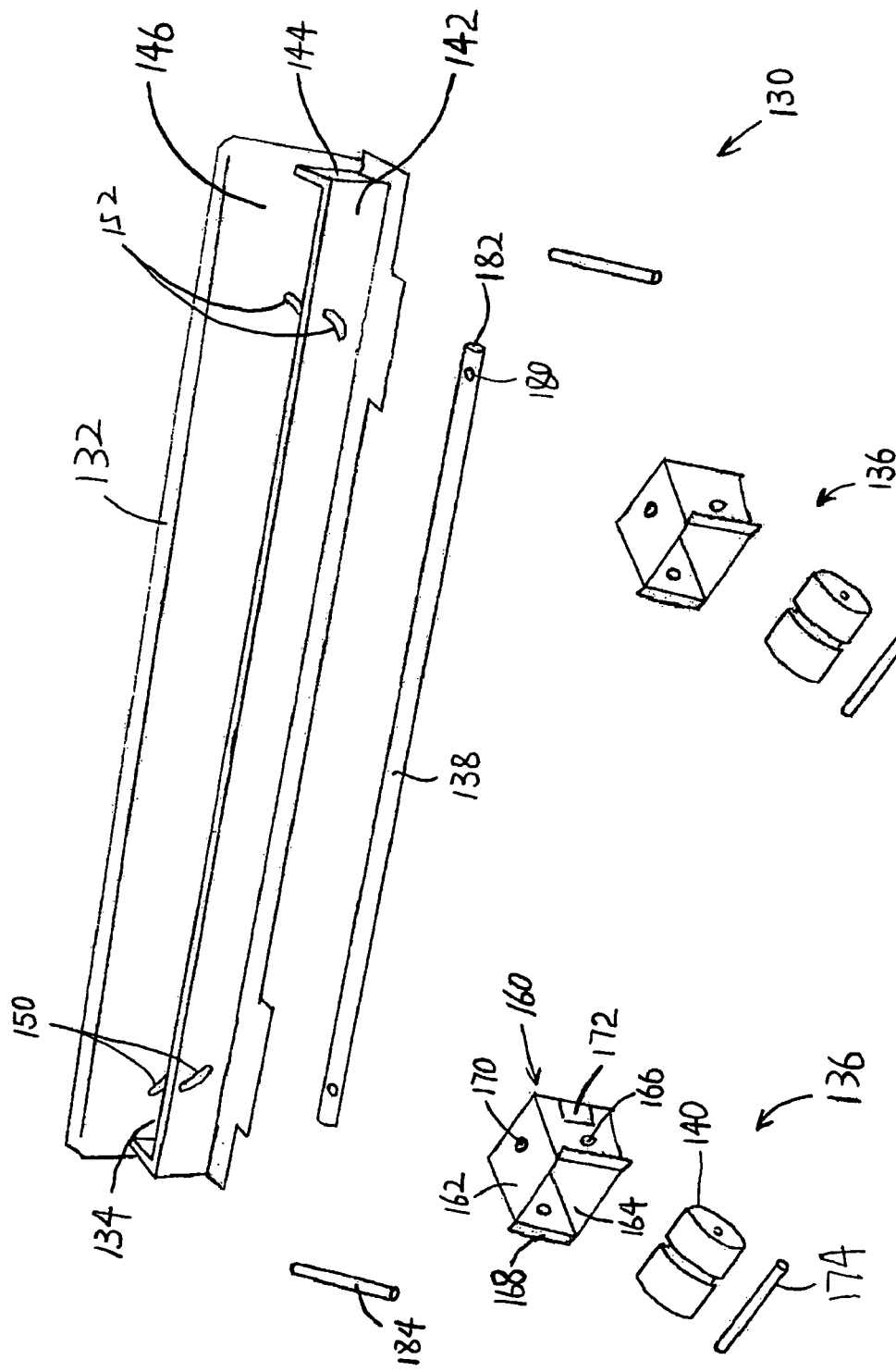
FIG. 3 is an exploded view of the self-adjustable supporting assembly shown in FIG. 2.

FIG. 3 is an exploded view of self-adjustable supporting assembly 130 shown in FIG. 2. Support base 132 includes a front wall 142, two side walls 144, and a rear wall 146 surrounding support channel 134 therein. Support base 132 includes a pair of angled sliding slots 150 respectively defined through the left portions of front and rear walls 142, 146. Support base 132 also includes a pair of angled sliding slots 152 respectively defined through the right portions of front and rear walls 142, 146. Both sliding slots 152 and 154 are identical in shape and positioned parallel to each other, respectively. Both sliding slots 152 and 154 are arc in shape, and have a substantially equal width along the entire length thereof. Sliding slots 150, 152 on the same wall 142 or 146 are positioned symmetrically with respect to each other. Specifically, sliding slots 150, 152 are distanced with respect to each other at a first distance at the lower end and a second distance at the higher end thereof. In the exemplary embodiment, the second distance is greater than the first distance.

Each roller assembly 136 includes a substantially cubical roller bracket 160 having four sidewalls 162 surrounding an opening 164 for partially receiving roller 140 therein. Roller bracket 160 also includes a pair of axle mounting openings 166 defined on two opposing sidewalls 162, two flanges 168 extending outward from the same two sidewalls 162, and a pair of pin mounting openings 170 defined on the other two sidewalls 162. Roller bracket 160 also includes a rod opening 172 defined on one of sidewalls 162. Roller assembly 136 further includes a roller axle 174 extending through axle mounting openings 166 and roller 140, such that roller 140 is rotatable about axle 174.

Rod 138 includes two openings 180 defined at two opposing ends 182 thereof, and each end 182 is insertable into roller bracket 160 through rod opening 172. Two linking pins 184 then extend through pin mounting openings 170 of roller brackets 160, and through openings 180 of rod 138, respectively. As such, each linking pin 184 hingedly connects roller assembly 136 to corresponding end 182 of rod 138, and each roller assembly 136 is rotatable on rod 138 about linking pin 184 which is substantially perpendicular to axle 174.

Figure 4:
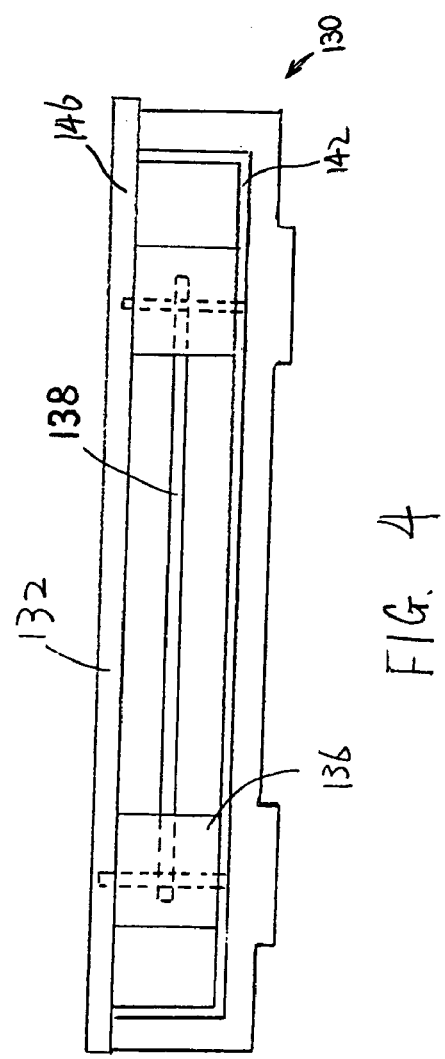
FIG. 4 is a top plan view of the self-adjustable supporting assembly shown in FIG. 2.

FIG. 4 is a top plan view of self-adjustable supporting assembly 130 shown in FIG. 2. Each linking pin 184 has a diameter slightly smaller than a width of sliding slot 150 or 152, and extends through corresponding sliding slots 150, 152 (shown in FIG. 3) defined on front and rear walls 142, 146. Pin 184 are substantially positioned in the corresponding positions of sliding slots 150, 152, and are positioned substantially perpendicular to front and rear walls 142, 146. As such, roller assembly 136 is able to move upward or downward as corresponding pin 184 slides upward or downward in sliding slots 150, 152.

Referring again to FIG. 2, pins 184 are spaced with respect to each other by rod 138 at a predetermined distance. As pin 184 slides toward the lower ends of sliding slots 150, rod 138 drives another pin 184 to slide toward the higher ends of sliding slots 152, and vice versa. As such, rod 138 moves in a first plane substantially parallel to rear wall 146 (shown in FIG. 3) to lift one of roller assemblies 136 while lowering another roller assembly 136. Self-adjustable supporting assembly 130 then automatically adjusts the positions of roller assemblies 136 to compensate for the contour of the floor (not shown).

In the exemplary embodiment, when supporting assembly 130 is mounted on cabinet 102 (shown in FIG. 1) of washing machine 100 (shown in FIG. 1), roller assembly 136 is rotatable with respect to cabinet 102. Specifically, roller 140 tilts to accommodate the contour of the floor, which facilitates contacting the floor along an entire length of roller 140. As such, the weight of machine 100 is substantially evenly loaded along an entire length of roller 140. Flanges 168 (shown in FIG. 3) of roller bracket 160 (shown in FIG. 3) are configured to interfere with an underside of support base 132 for restricting rotation of roller assembly 136 within a predetermined range.

In another embodiment in which machine 100 is a horizontal clothes treating machine, the rotation of the basket (not shown) during a wash/spin cycle produces a force substantially parallel to rear panel 109. Roller 140 is rotatable about axle 174 (shown in FIG. 3) which is substantially parallel to rear panel 109. As such, the movement of rollers 140 under the force caused by basket rotation is considerably reduced, which facilitates keeping machine 100 stationary during the operation.

While the invention has been described in terms of various specific embodiments, those skilled in the art will recognize that the invention can be practiced with modification within the spirit and scope of the claims.

What is claimed is:

1. An assembly for supporting a home appliance including a cabinet having a top panel, a bottom panel, side panels, a front panel, and a back panel, said assembly comprising:
   a support base comprising a front wall and an opposite rear wall;
   a first slot and a second slot defined in each of said front wall and said rear wall such that said first slots are substantially aligned and said second slots are substantially aligned;
   a first roller assembly and a second roller assembly mounted on said support base, each of said first roller assembly and said second roller assembly comprising a roller rotatable about an axle;
   a rod extending between said first roller assembly and said second roller assembly;
   a first linking pin extending between said first slots to couple said first roller assembly to said rod, said first roller assembly rotatable with respect to said first linking pin; and
   a second linking pin extending between said second slots to couple said second roller assembly to said rod, said second roller assembly rotatable with respect to said second linking pin, said first linking pin slideable within said first slots and said second linking pin slideable within said second slots to move said first roller assembly and said second roller assembly.

2. An assembly in accordance with claim 1 wherein said first linking pin and said second linking pin are slideable within said first slots and said second slots such that said rod lifts one of said roller assemblies when lowering another one of said roller assemblies.

3. An assembly in accordance with claim 1 wherein each of said first roller assembly and said second roller assembly comprises a roller bracket at least partially receiving said roller therein, said roller bracket coupled to said rod.

4. An assembly in accordance with claim 3 wherein said roller bracket further comprises a flange extending therefrom, said flange configured to restrict said roller bracket to rotate within a predetermined angle.

5. An assembly in accordance with claim 3 wherein said linking pins couple said roller brackets and said rod together.

6. An assembly in accordance with claim 1 wherein said support base further defines a support channel therein, said roller assemblies and said rod at least partially received in said support channel.

7. An assembly in accordance with claim 1 wherein said support basc is configured to be mounted on the bottom panel and positioned adjacent the back panel.

\* \* \* \* \*